Dec. 22, 1953 — G. C. SHINN — 2,663,573
CONVERTIBLE TRAILER
Filed May 5, 1952 — 5 Sheets-Sheet 1
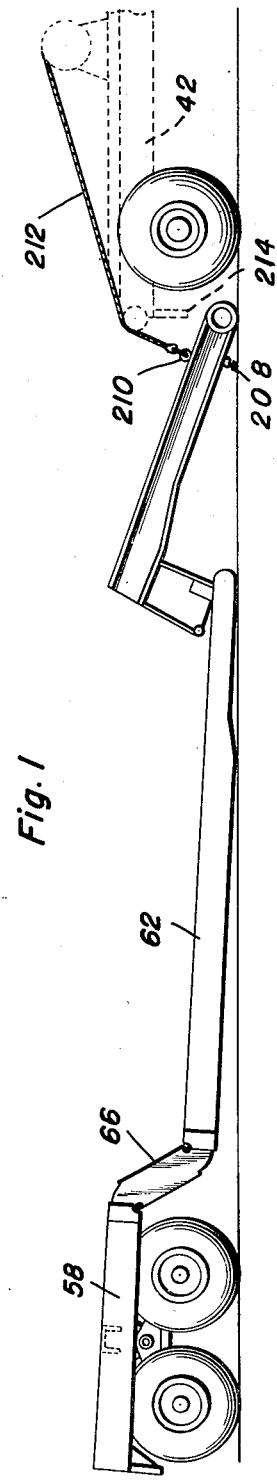
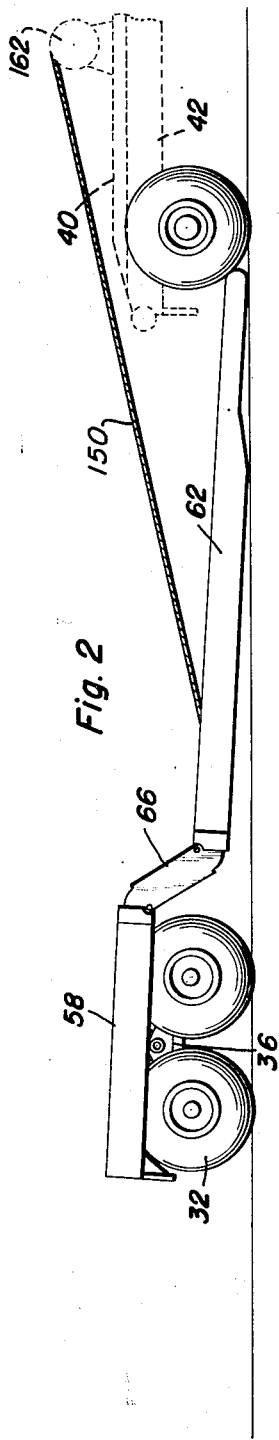
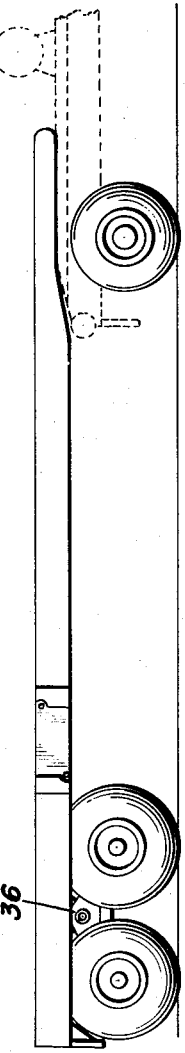
Guy C. Shinn
INVENTOR.

Dec. 22, 1953

G. C. SHINN 2,663,573

CONVERTIBLE TRAILER

Filed May 5, 1952

Guy C. Shinn
INVENTOR.

BY Clarence A. O'Brien
and Harvey B. Jacobson
Attorneys

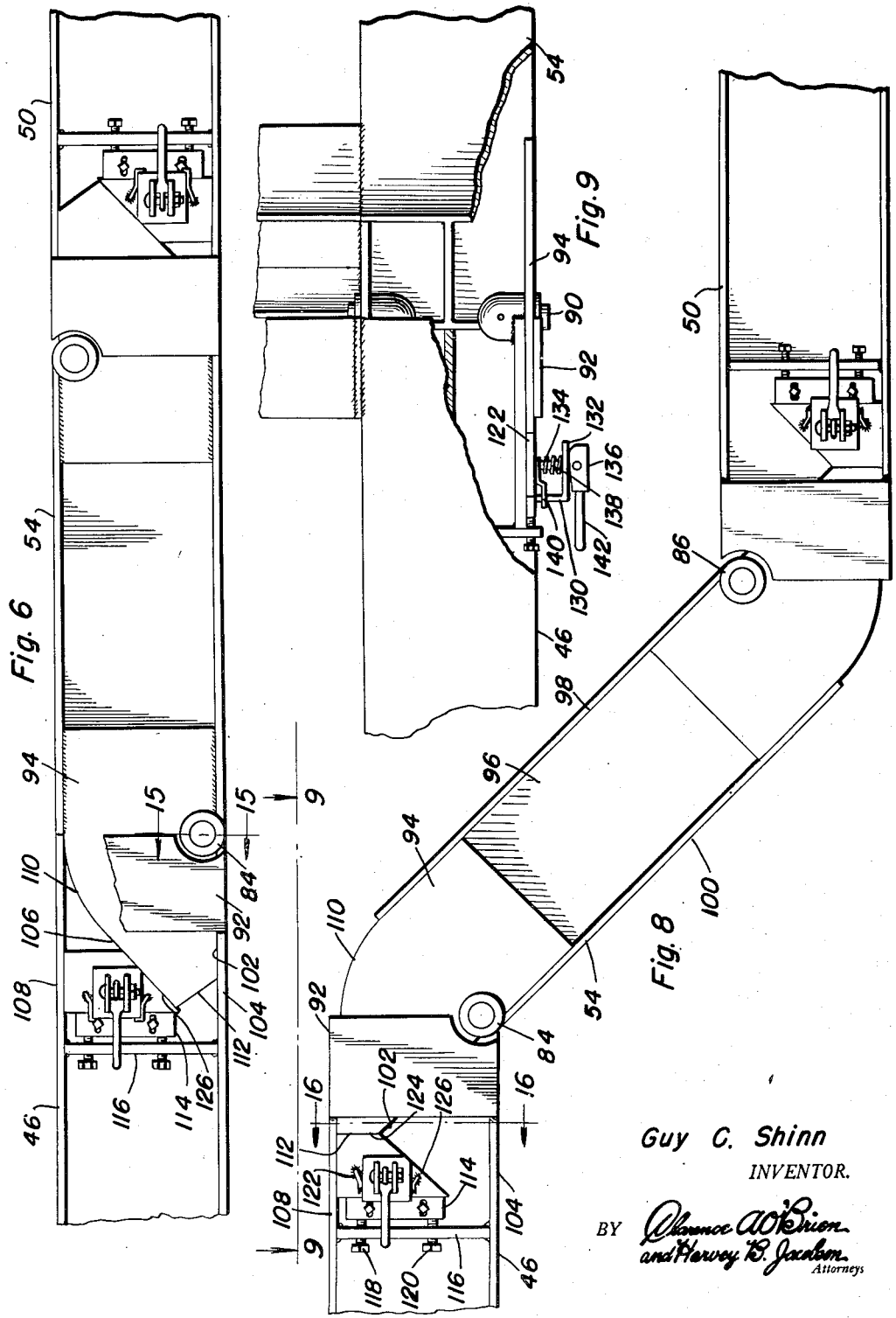

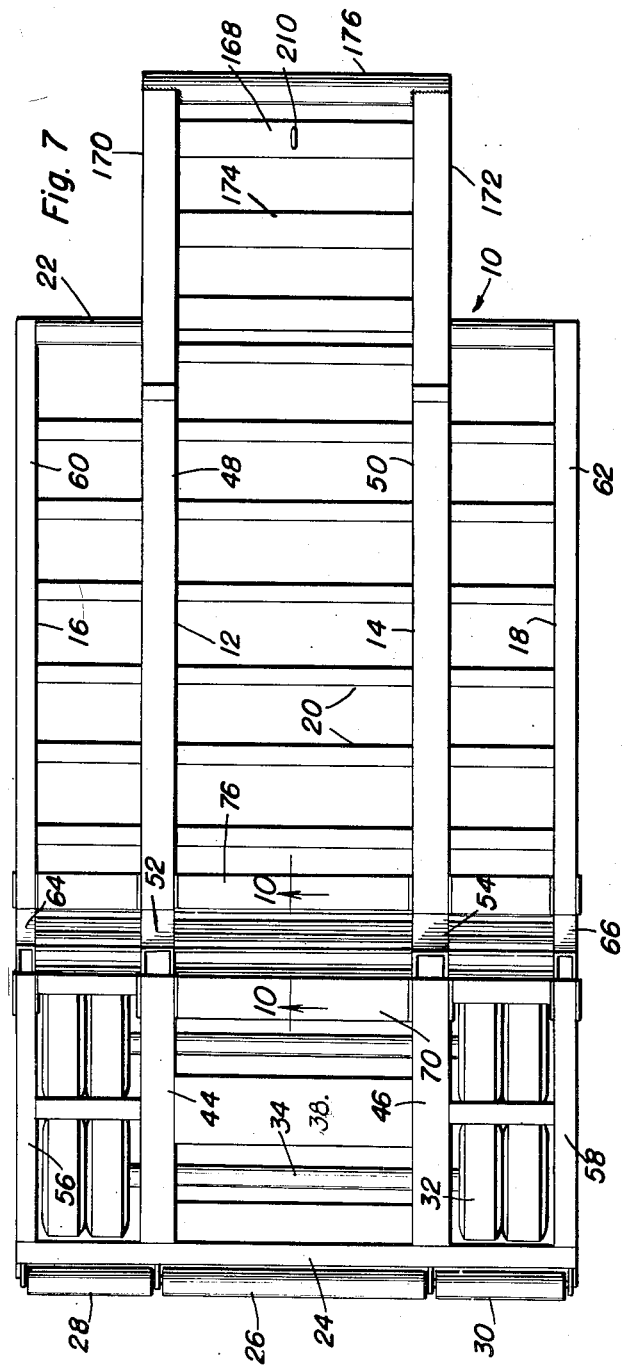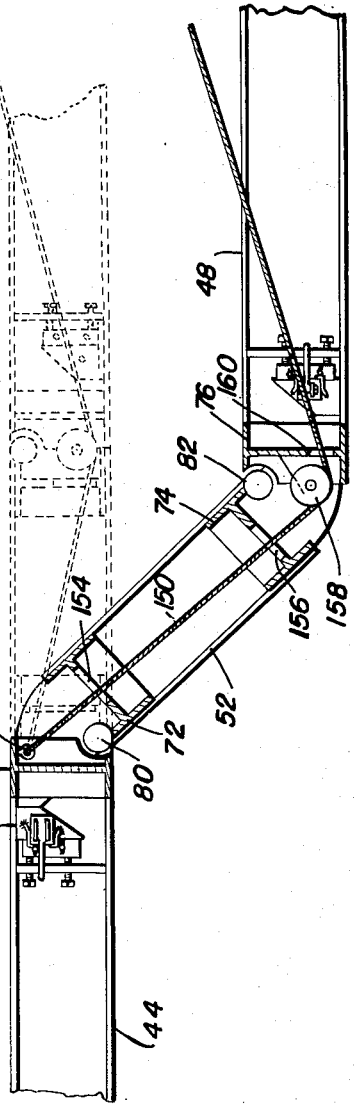
Guy C. Shinn
INVENTOR.

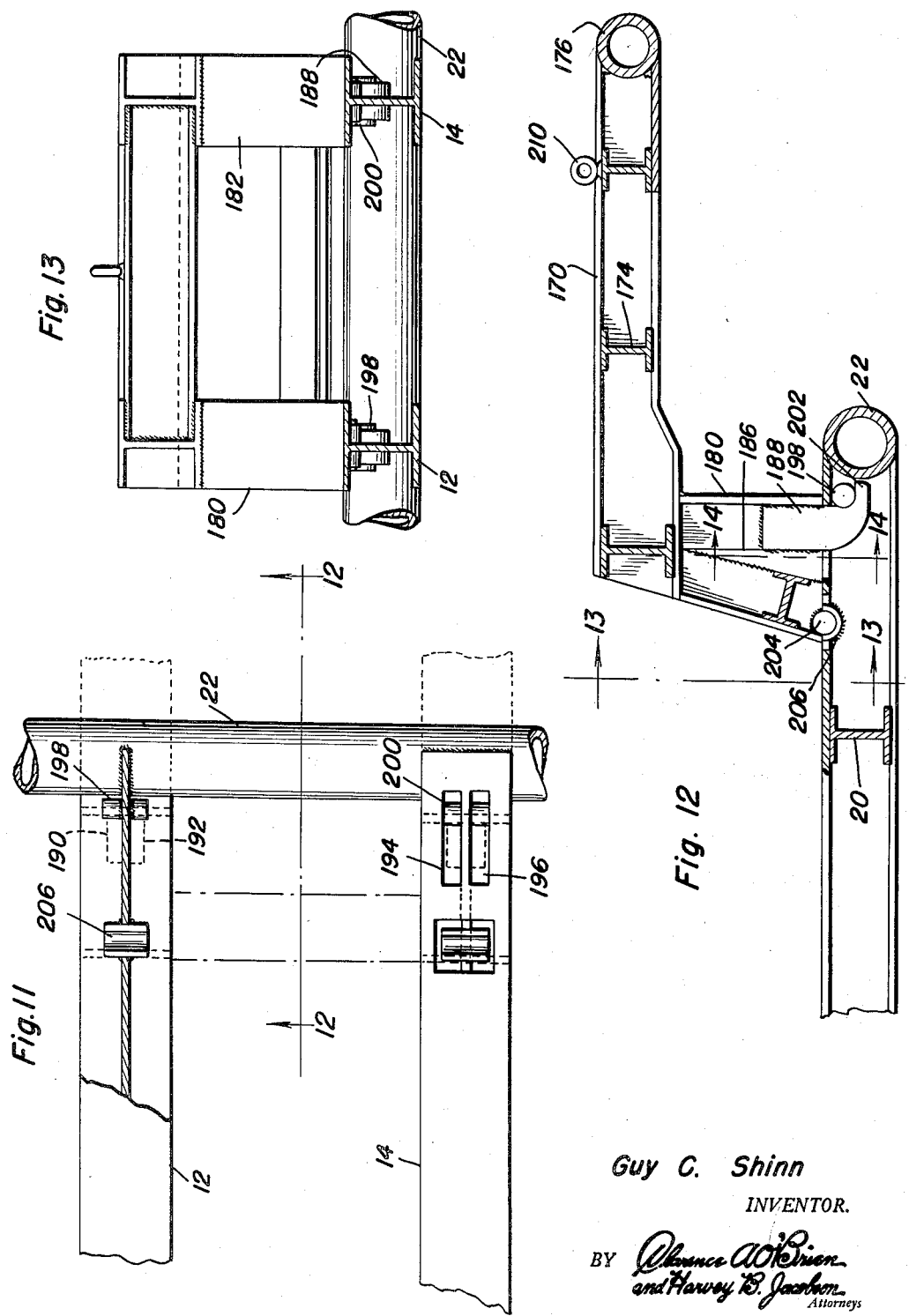

Patented Dec. 22, 1953

2,663,573

UNITED STATES PATENT OFFICE 2,663,573

CONVERTIBLE TRAILER

Guy C. Shinn, Hamilton, Tex., assignor of one-half to C. T. Gautier, Hamilton County, Tex.

Application May 5, 1952, Serial No. 286,075

11 Claims. (Cl. 280—415)

1

This invention relates to a convertible trailer and particularly to a trailer which is converted from a straight flat bed trailer to an offset or lowboy trailer for carrying heavy equipment.

In the heavy contracting business it is essential to have various types of trailers to perform the various types of work performed. For example, it is necessary to have large flat bed trucks or trailers to carry long members such as prefabricated spans of bridges or other such types of materials. Likewise, it is necessary to have so-called lowboy or offset bed trailers for carrying drag lines, heavy shovels or other such heavy working equipment. It is found that it is almost never necessary to use these two types of trailer equipment at the same time, consequently a single tractor or single group of tractors may be utilized to haul both types of trailers. However, it results that very much expensive equipment is lying idle while the other type of equipment is being used.

The present invention provides a convertible trailer which can be utilized as either a flat bed trailer or as a lowboy trailer so that a single piece of equipment can be utilized to perform either the duties of the flat bed trailer or of the lowboy trailer as may be desired.

The objects of the invention are carried out by constructing a trailer having articulated intermediate members so that the forward portion of the trailer body may be either in longitudinal alignment with the rear portion of the body in which case it is a flat bed trailer or the front portion may be offset with respect to the rear portion of the trailer carried by a gooseneck onto the supporting tractor so that the forward portion of the body will be elevated only a slight distance from the ground and the forward end of the body may be lowered into contact with the ground so that the equipment may be driven thereon.

It is accordingly an object of the invention to provide a convertible trailer.

It is another object of the invention to provide a trailer which may be converted and locked in converted position.

It is a further object of the invention to provide an improved articulating member for a trailer.

It is a further object of the invention to provide an improved hitch for a trailer.

It is a further object of the invention to provide a trailer hitch which may be readily detached from the trailer.

It is a further object of the invention to pro-

2 vide an actuating means for converting the trailer from a straight bed to a lowboy trailer.

Other objects and many of the attendant advantages of the present invention will be apparent from the following detailed description taken in conjunction with the accompanying drawings, in which:

Figure 1 is a side elevation of the trailer in lowboy position with the gooseneck being removed;

Figure 2 is a side elevation of the trailer with the lifting line in position;

Figure 3 is a side elevation of the trailer in flat bed condition;

Figure 6 is a detail elevation of the lock in flat bed position;

Figure 7 is a top plan view of the trailer and gooseneck in lowboy condition;

Figure 8 is a detail elevation of the lock in lowboy position;

Figure 9 is a detail plan view partially in section of the lock taken substantially in the plane indicated by the line 9—9 of Figure 8;

Figure 10 is a vertical section taken substantially on the plane indicated by the line 10—10 of Figure 7 and showing the connection of the lifting line;

Figure 11 is an enlarged plan view of the front of the trailer with the gooseneck removed and with parts broken away and in section to show the construction;

Figure 12 is a vertical section showing the connection of the gooseneck and taken substantially on the plane indicated by the line 12—12 of Figure 11;

Figure 13 is an enlarged cross section of the gooseneck connection taken substantially on the plane indicated by the line 13—13 of Figure 12;

Figure 4:
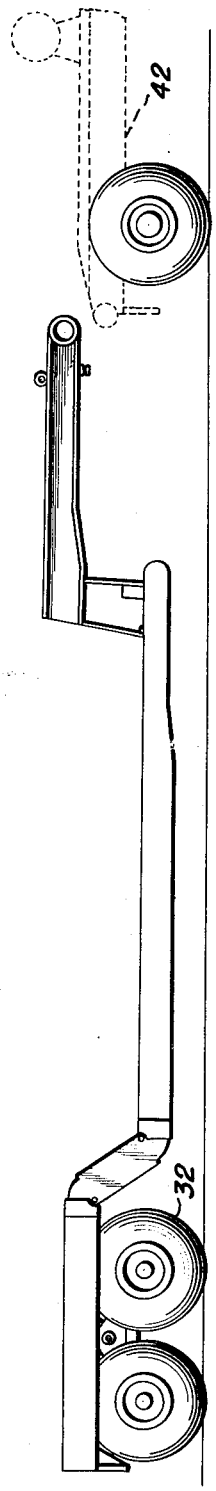
Figure 4 is a side elevation of the lowboy with gooseneck in position.
Figure 5:
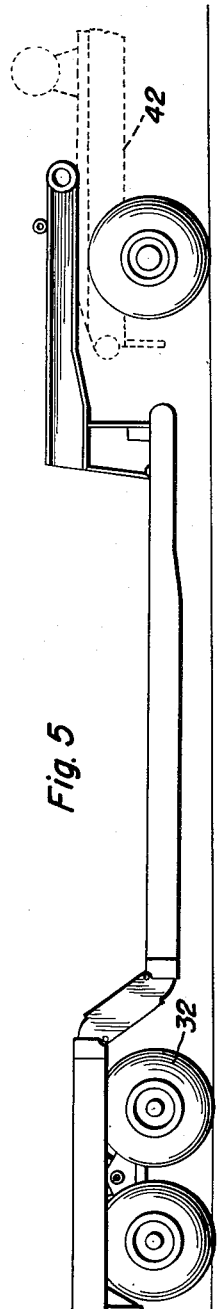
Figure 5 is a similar view showing the gooseneck engaged with the fifth wheel of a tractor.
Figure 16:
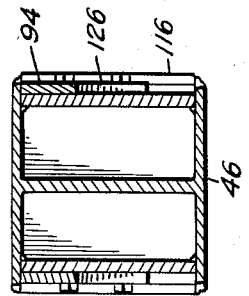
Figure 16 is an enlarged cross section of the lock mechanism taken substantially on the line indicated by the line 16—16 of Figure 8.
Figure 15:
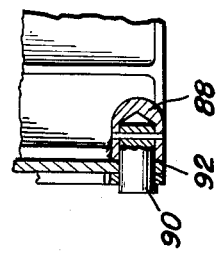
Figure 15 is an enlarged cross section of the articulation of the longitudinal frame members taken substantially on the plane indicated by the line 15—15 of Figure 6.
Figure 14:
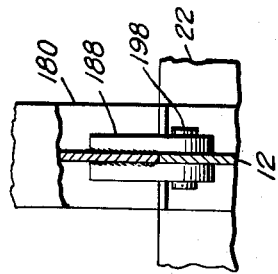
Figure 14 is an enlarged cross section of the attaching hook taken substantially on the plane indicated by the line 14—14 of Figure 12.

In the exemplary embodiment of the invention a convertible trailer 10 is constructed of longitudinal main frame members 12 and 14 which together with outside frame members 16 and 18 are operatively joined together by transverse beam members 20 to provide a trailer platform. It being understood that suitable planking members, not shown, are placed on the platform when the trailer is being used to transport various types of material. The longitudinal members 12 and 14 and the side members 16 and 18 are joined together at the front thereof by means of a transverse member 22 preferably formed of a tubular member welded to the longitudinal members. The rear ends of the members 12 and 14 as well as the side members 16 and 18 are joined together by a transverse beam 24 in which is journaled rollers 26, 28 and 30 which as is well known are utilized to load material onto and off of the flat bed trailer.

Supporting wheels 32 preferably mounted on a plurality of axles 34 are operatively connected in supporting relation to the transverse members 12 and 14 by suitable rocking connections 36 mounted on a transverse member 38 welded between the longitudinal members 12 and 14.

When the trailer is utilized as a flat bed trailer the front end of the members 14 and 12 are supported on a fifth wheel 40 of a suitable tractor 42.

In order to convert the flat bed trailer as described into a lowboy or low bed trailer the members 12 and 14 and preferably the members 16 and 18 are articulated adjacent the rear section so that the main frame members 12 and 14 are provided with rear frame members 44 and 46, front frame members 48 and 50 and intermediate frame members 52 and 54. Likewise the members 16 and 18 are provided with rear sections 56 and 58, front sections 60 and 62, intermediate sections 64 and 66. A hinge member is provided between each of the members 44 and 46 and the intermediate members 52 and 54 and likewise hinge members are provided between the intermediate members 52 and 54 and the front sections 48 and 50. The hinge members between the members 44, 46 and intermediate members 52 and 54 are so positioned that they allow the intermediate members to move downwardly to assume an angular relation with the rear members or sections 44 and 46. Likewise the hinge members between the front sections 48 and 50 and the intermediate sections 52 and 64 are so arranged that the intermediate sections extend upwardly with respect to the front sections 48 and 50. This enables the front sections 48 and 50 to be either in direct alignment with the rear sections 44 and 46 or vertically offset with respect to the rear sections 44 and 46 so that the front sections will be adjacent the ground and much lower in respect to the ground than the rear sections. The rear sections 44 and 46 are connected by a cross member 70 the rear end of the intermediate members 52 and 54 being connected by a cross member 72 and the front ends of the intermediate members 52 and 54 being connected by cross member 74, while the rear ends of the front sections 48 and 50 are connected together by cross member 76. The longitudinal beams 12 and 14 are preferably constructed of H-shaped members, obviously, any desired form of structural member could be utilized. A hinge 80 connects the member 44 with member 52 and a hinge 82 connects the member 52 to member 48 while a hinge 84 connects the member 46 to the member 54 while a hinge 86 connects the member 54 to the member 50 with the hinges 80 and 84 being in transverse alignment across the platform and the hinges 82 and 86 also being in transverse alignment so that the members are articulated and can be readily moved with respect to each other while the hinges 80 and 84 are in the bottom of the beam member so that the members 52 and 54 may drop downwardly with respect to the members 44 and 46 or may be lifted into alignment therewith. While the hinges 82 and 86 are on the top edge of the beam the members 48 and 50 remain substantially parallel to the members 44 and 46 but may be in offset relation thereto to provide the lowboy body. Each of the hinges 80 to 86 comprises a cup-shaped member 88 rigidly secured as by welding onto the flange of the H-beam to which it is attached and has a cylinder 90 rigidly secured therein and extending through a hinge plate 92 rigidly secured onto the adjoining member. Each of the hinge members is provided with a limit member 94 rigidly connected to one of the articulated members and extending into and between the flanges of the adjacent member. The member 94 which for example is connected into the intermediate portion 54 is of the same width as the web 96 between the outside flanges 98 and 100. The limit member 94 has a longitudinally extending edge 102 which contacts with the lower flange 104 of the member 46 when the intermediate member is in alignment with the rear member and also is provided with a contact surface 106 which contacts with the upper flange 108 of the member 46 when the intermediate member is in lowered or depending position. The edges 102 and 106 in cooperation with the flanges 104 and 108 thereby provide limit stops by which the angular motion about the hinge 84 can be readily determined. A curved surface 109 is provided between the stop surface 106 and the edge adjacent the flange 98 so that the member may readily move from one position to another without binding. For example, if the maximum drop of the member 54 is to be 45° then the surface 106 will be at 45° with respect to the flange 98. The limit member 94 is also provided with a locking surface 112 for a purpose presently to be described.

A stop 114 is mounted in the member 46 preferably by means of a plate 116 welded or otherwise secured between the outer flanges 104 and 108. The stop 114 being adjustably connected to the member 116 by suitable means such as bolts 118 and 120. A lock block 122 is interposed between the stop 114 and the blocking surfaces of the limit members 94. The lock block 122 is provided with a locking surface 124 which cooperates with the surface 112 of the limit member so that when the limit member is against the flange 108 the block 122 will drop between the stop 114 and the surface 112 and inhibit any angular motion about the hinge 84. Likewise the block 122 is provided with a surface 126 which cooperates with the surface 106 when the limit member 94 has the stop surface 102 against the flange 104 so that the members are locked in aligned or straight position and are incapable of angular motion. The hinges 80, 82 and 86 are identical with the hinge 84 except for the reversal of the hinges 82 and 86 and specific description of these hinges will be omitted. For conveniently maintaining the lock blocks 122 in proper relation to be inserted between the stop 116 and the limit member 94 the bracket 130 is mounted on the block 114 and has an outwardly extending top 132. A pin 134 is secured on the surface of the block 122 and extends through the plate 132 where it is engaged by a cam 136. The cam 136 has a surface for lifting or dropping the block 122 while the block is urged towards locking position by means of a spring 138. A guide 140 is mounted on the block 122 and engages the bracket 130 so that the lock block is always in proper position with respect to the stop 114 and the locking surfaces of the limit member 94. Cam 136 is preferably controlled by a handle 142 herein shown as manually controlled for each locking member.

In order to provide the necessary connection for lifting the forward portion or section of the platform into and out of alignment with the rear section of the platform a lifting element preferably of the flexible type and herein shown as a cable 150 is connected to an eye 152 on the cross member 70 and extends through an aperture 154 in the cross member 72, an aperture 156 in cross member 74 and is entrained over a sheave 158 mounted on the cross member 76 and passes through an aperture 160 in the cross member 76 and extends upwardly towards a winch 162 mounted on the tractor 42.

For supporting the forward end of the lowboy tractor trailer on the tractor a gooseneck is provided having a pair of side rails 170 and 172 assembled in spaced relation by means of a cross member 176 preferably of tubular formation and welded into the ends of the members 170 and 172. Members 170 and 172 are preferably H-beams which have had a portion of the central web cut out so that the forward portion of the beams 170 and 172 is of less depth than the rear portions of beams 170 and 172. Downwardly extending portions 180 and 182 are preferably of downwardly flowing construction and for example are constructed by taking an H-beam, slitting the web thereof and inserting a wedge shape 186 whereby the lower ends of the members 180 and 182 are of greater width than the upper ends of these members. A fastening hook on each of the legs 180 and 182 comprises hook-shaped members 188 welded on each side of the webs of the members 180 and 182 and extending therebelow in hooked shaped relation. Top flanges of the beams 12 and 14 are provided with slots 190, 192, 194 and 196 for receiving the various hook members 188. The beam 12 is provided with a hook bar 198 while the beam 14 is provided with a hook bar 200. The hooks 188 are dropped through the slots 190 to 196 and move forward so that hooks 202 hook under the hook bars 198 and 200 while the rearward portion of the legs 180 and 182 will rest on the surface of the platform. Bearing blocks 204 are mounted adjacent the rear edges of the legs 180 and 182 while bearings 206 mounted in the beams 12 and 14 receive the bearing blocks 204 so that when the outward end of the gooseneck 168 is lifted upwardly the hooks 202 will be firmly engaged with the hook bars while the bearing blocks will be engaged in the bearings to immobilize the gooseneck with respect to the forward section of the converted trailer. Suitable means such as a kingpin 208 may be provided on the gooseneck for cooperation with the fifth wheel 40 of the tractor 42.

The gooseneck 168 is provided with a tie ring 210 which may be connected to a lifting line 212 for disengaging the gooseneck from the tractor trailer.

In the operation of the trailer as a flat bed device the hinges will be freed and the sections lifted by means of the line 150 until the sections are all in alignment after which the lock blocks will be placed in position so that the hinges are all immobilized with the bed in straight position. The front end of the front section will then be associated with the fifth wheel of any suitable tractor so that the flat bed trailer may be utilized as desired. To convert the flat bed trailer to the lowboy trailer the line 150 will be tightened to take the pressure off the stop blocks after which they will be loosened and the line released to allow the trailer to move about the articulations so that the front section of the trailer is offset in vertical relation to the rear section of the trailer after which the lock blocks will be returned to position to prevent angular motion about the hinges. The tractor 42 will be moved backwards until the bumper guard 214 overlies the end of the gooseneck 168 and the lifting line 212 will be attached to the eye 210 and the tension on the line 212 will cause the forward end of the gooseneck to come in contact with the bumper after which the gooseneck will be removed angularly about the bumper 214 so that the hook members 188 may be adjusted into the slots after which the gooseneck will be moved forward to engage the hooks 202 under the hook bars 198 and 200 after which the forward end of the gooseneck will be elevated onto the fifth wheel and the kingpin 208 engaged therein. Lifting up the gooseneck will bring the bearing blocks into cooperation with the bearings in the frame members so that the gooseneck is immobile therewith. Obviously, in order to remove the gooseneck it will be apparent that it is moved with the front end on the ground after which the tractor is backed up to release the hook members 202 after which the tension member 212 will lift the gooseneck out of engagement with the hook bars and the front end of the lowboy tractor or trailer will be available for running heavy machinery thereon.

It will thus be seen that the present invention provides a simple convertible trailer which may be utilized either as a flat bed trailer for handling long unwieldy objects or may be converted into a lowboy trailer for handling heavy large objects with a maximum clearance therewith. The gooseneck connection of the lowboy trailer being readily removed so that the machinery can be loaded onto the lowboy trailer without any interference therefrom and the same may be conveniently connected or disconnected by means of the power of the tractor so that it is not necessary to attempt to handle such heavy equipment.

For purpose of exemplification a particular embodiment of the invention has been shown, and described according to the best present understanding thereof. It will be obvious to those skilled in the art that many changes and modifications can be made therein without departing from the true spirit of the invention.

Having described the invention, what is claimed as new is:

1. A convertible flat bed lowboy trailer comprising a pair of parallel longitudinally extending frame members, supporting wheels operatively mounted adjacent one end of said frame, a detachable gooseneck hitch engageable with the other end of said frame, each of said frame members being constituted of a structural shape including a central web and edge flanges transverse to said web, said gooseneck including a structural shape having a web, a hook secured on said web adjacent the front edge thereof, a transverse bearing block secured to said web in rearwardly spaced relation to said hook, a hook bar secured in the web of said frame member, said transverse flange having a slot admitting said hook, a bearing on said frame member adapted to engage said bearing block.

2. A convertible trailer comprising a pair of longitudinally extending platform supporting frame beams, supporting wheels operatively mounted adjacent the rear ends of said beams, each of said beams including a central web and edge flanges, a hook bar secured transversely of said web adjacent the front ends of said beams, a gooseneck including a member contacting the top of said beam, a hook member secured on said gooseneck, said edge flanges having a slot adjacent said hook bar, said hook extending through said slot and into engagement with said hook bar.

3. A convertible trailer comprising a pair of longitudinally extending platform supporting frame beams, supporting wheels operatively mounted adjacent the rear ends of said beams, each of said beams including a central web and edge flanges, a hook bar secured transversely of said web adjacent the front ends of said beams, a gooseneck including a member contacting the top of said beam, a hook member secured on said gooseneck, said edge flanges having a slot adjacent said hook, said hook extending through slot and into engagement with said hook bar, a bearing mounted on said beam in spaced relation to said hook bar, a bearing block on said gooseneck adapted to engage said bearing.

4. A convertible trailer comprising a pair of longitudinally extending platform supporting frame beams, supporting wheels operatively mounted adjacent the rear ends of said beams, each of said beams including a central web and edge flanges, a hook bar secured transversely of said web adjacent the front ends of said beams, a gooseneck including a member contacting the top of said beam, a hook member secured on said gooseneck, said edge flanges having a slot adjacent said hook, said hook extending through slot and into engagement with said hook bar, a bearing mounted on said beam in spaced relation to said hook bar, a bearing block on said gooseneck adapted to engage said bearing, said slots being elongated whereby said hooks may slide longitudinally into and out of engagement with said hook bars.

5. A convertible trailer comprising a pair of longitudinally extending platform supporting frame beams, supporting wheels operatively mounted adjacent the rear ends of said beams, each of said beams including a central web and edge flanges, a hook bar secured transversely of said web adjacent the front ends of said beams, a gooseneck including a member contacting the top of said beam, a hook member secured on said gooseneck, said edge flanges having a slot adjacent said hook, said hook extending through said slot into engagement with said hook bar, a bearing mounted on said beam in spaced relation to said hook bar, a bearing block on said gooseneck adapted to engage said bearing, said slots being elongated whereby said hooks may slide longitudinally into and out of engagement with said hook bars, a pair of spaced hinge joints in each of said beams, said joints being operative to selectively position said frame in alignment and in vertical offset relation.

6. A convertible trailer comprising longitudinal frame beams, spaced apart oppositely disposed hinge members in each of said beams, said hinge members being transversely aligned, said frame members constructed of a rear section, an intermediate section and a main front section, said intermediate section extending between said hinge members, limit members extending across said hinge members, locking surfaces on said limit members, stops spaced from said limit members, lock blocks selectively positionable between said surfaces and said stops for immobilizing said hinge members, a bracket mounted on each of said stops, an operating rod secured to each of said lock blocks, an actuating cam on said brackets selectively operable to move said lock blocks into and out of locking position.

7. A convertible trailer comprising a platform supporting frame, said frame including a pair of longitudinally extending tie beams, each of said tie beams including a rear section, a main front section and an intermediate section, said intermediate section being hingedly connected to said rear and front sections, a limit member extending between said rear section and said intermediate section, said limit member being fixed to one of said sections, contact surfaces on said limit member engaging the flanges of the other section to limit angular movement of said sections, a stop member mounted in spaced relation to the contact surfaces of said limit member, a lock block selectively engageable between said limit member and said stop when either of said contact surfaces is in engagement with a flange, said lock block when in position inhibiting hinge movement between said sections.

8. A convertible trailer comprising a platform supporting frame, said frame including a pair of longitudinally extending tie beams, each of said tie beams including a rear section, a main front section and an intermediate section, said intermediate section being hingedly connected to said rear and front sections, a limit member extending between said rear section and said intermediate section, said limit member being fixed to one of said sections, contact surfaces on said limit member engaging the flanges of the other section to limit angular movement of said sections, a stop member mounted in spaced relation to the contact surfaces of said limit member, a lock block selectively engageable between said limit member and said stop when either of said contact surfaces is in engagement with a flange, said lock block when in position inhibiting hinge movement between said sections, an actuating member engaged between said rear and front section and extending across said intermediate section, said actuating member being operable when said lock blocks are disengaged to selectively move said front section into alignment with or offset relation with said rear section.

9. A convertible trailer comprising a platform supporting frame, said frame including a pair of longitudinally extending tie beams, each of said tie beams including a rear section, a main front section and an intermediate section, said intermediate section being hingedly connected to said rear and front sections, a limit member extending between said rear section and said intermediate section, said limit member being fixed to one of said sections, contact surfaces on said limit member engaging the flanges of the other section to limit angular movement of said sections, a stop member mounted in spaced relation to the contact surfaces of said limit member, a lock block selectively engageable between said limit member and said stop when either of said contact surfaces is in engagement with a flange, said lock block when in position inhibiting hinge movement between said sections, a second limit member extending between said intermediate section and said front section, a second lock block cooperating with said second limit member.

10. A convertible trailer comprising a platform supporting frame, said frame including a pair of longitudinally extending tie beams, each of said tie beams including a rear section, a main front section and an intermediate section, said intermediate section being hingedly connected to said rear and front sections, said hinge connections being operable in opposite directions, a limit member extending between said rear section and said intermediate section, said limit member being fixed to one of said sections, contact surfaces on said limit member engaging the flanges of the other section to limit angular movement of said sections, a stop member mounted in spaced relation to the contact surfaces of said limit member, a lock block selectively engageable between said limit member and said stop when either of said contact surfaces is in engagement with a flange, said lock block when in position inhibiting hinge movement between said sections.

11. A convertible trailer comprising a platform supporting frame, each frame including a pair of longitudinally extending tie beams, each of said tie beams including a rear section, a main front section and an intermediate section, said intermediate section being hingedly connected to said rear and front sections, said hinge connections being operable in opposite directions, a limit member extending between said rear section and said intermediate section, said limit member being fixed to one of said sections, contact surfaces on said limit member engaging the flanges of the other section to limit angular movement of said sections, a stop member mounted in spaced relation to the contact surfaces of said limit member, a lock block selectively engageable between said limit member and said stop when either of said contact surfaces is in engagement with a flange, said lock block when in position inhibiting hinge movement between said sections, said stops being adjustable.

GUY C. SHINN.

References Cited in the file of this patent

UNITED STATES PATENTS

| Number | Name | Date |
|---|---|---|
| 2,227,762 | Ronning | Jan. 7, 1941 |
| 2,443,611 | Ferguson | June 22, 1948 |
| 2,452,789 | Pike | Nov. 2, 1948 |
| 2,475,443 | Bill | July 5, 1949 |
| 2,568,283 | Harpster | Sept. 18, 1951 |
| 2,611,496 | Martin | Sept. 23, 1952 |
| 2,613,945 | Talbert | Oct. 14, 1952 |

FOREIGN PATENTS

| Number | Country | Date |
|---|---|---|
| 475,232 | Great Britain | Apr. 6, 1937 |